United States Patent

Salinas et al.

[11] Patent Number: 5,958,616
[45] Date of Patent: Sep. 28, 1999

[54] MEMBRANE AND ELECTRODE STRUCTURE FOR METHANOL FUEL CELL

[75] Inventors: Carlos Salinas, Bryan; Stanley F. Simpson, College Station; Oliver J. Murphy, Bryan; Kryzysztof Franaszczuk, College Station; Homayoun Moaddel, Bryan; Dacong Weng, College Station, all of Tex.

[73] Assignee: Lynntech, Inc., College Station, Tex.

[21] Appl. No.: 09/019,733

[22] Filed: Feb. 6, 1998

[51] Int. Cl.⁶ .................................................. H01M 4/86
[52] U.S. Cl. ................................ 429/41; 429/42; 429/44; 429/40; 429/30; 429/33; 427/115; 204/296; 204/282; 521/27
[58] Field of Search ......................... 429/30, 31, 33, 429/34, 38, 40, 41, 42, 44

[56] References Cited

U.S. PATENT DOCUMENTS

| | | | |
|---|---|---|---|
| 3,134,697 | 5/1964 | Niedrach | 136/86 |
| 4,272,353 | 6/1981 | Lawrance et al. | 204/283 |
| 4,326,930 | 4/1982 | Nagel et al. | 204/20 |
| 4,364,813 | 12/1982 | White | 204/252 |
| 4,959,132 | 9/1990 | Fedkiw, Jr. | 204/101 |
| 5,186,877 | 2/1993 | Watanabe | 429/42 |
| 5,211,984 | 5/1993 | Wilson | 427/115 |
| 5,234,777 | 8/1993 | Wilson | 429/42 |
| 5,272,017 | 12/1993 | Swathirajan et al. | 429/42 |
| 5,523,181 | 6/1996 | Stonehart et al. | 204/296 |
| 5,525,436 | 6/1996 | Savinell et al. | 429/30 |
| 5,635,039 | 6/1997 | Cisar et al. | 429/40 |
| 5,672,438 | 9/1997 | Banerjee et al. | 429/33 |
| 5,672,439 | 9/1997 | Wilkinson et al. | 429/40 |
| 5,679,482 | 10/1997 | Ehrenberg et al. | 429/249 |
| 5,716,664 | 2/1998 | Marchetti | 427/115 |

OTHER PUBLICATIONS

H. Takenaka, E. Torikai, Y. Kawami and N. Wakabayashi, "Solid Polymer Electrolyte Water Electrolysis," Publication Jul. 14, 1981, pp. 397–403.

*Primary Examiner*—Bruce F. Bell
*Attorney, Agent, or Firm*—Streets & Associates; Jeffrey L. Streets; Cynthia Seal

[57] ABSTRACT

The invention provides devices and techniques for reducing or eliminating fuel crossover from the anode to the cathode in fuel cells using organic fuels. The invention particularly provides proton exchange membranes having passages or channels with or without a catalyst layer active for the electrochemical oxidation of a fuel. The invention reduces fuel crossover by providing void spaces within the membrane where the fuel may be sequestered as it diffuses through the membrane from the anode to the cathode. The sequestered fuel may be removed physically and/or electrochemically. The invention provides for physical removal of the sequestered fuel by means of flowing a gas stream or a liquid stream through the passages thus evacuating the fuel before it diffuses to the cathode. Electrochemical removal of the fuel involves coating the inner walls of the passages with a catalyst, electronically connecting the catalyst with the anode, and electrooxidation of the crossover fuel sequestered in contact with the catalyst which is active for this oxidation process.

22 Claims, 4 Drawing Sheets

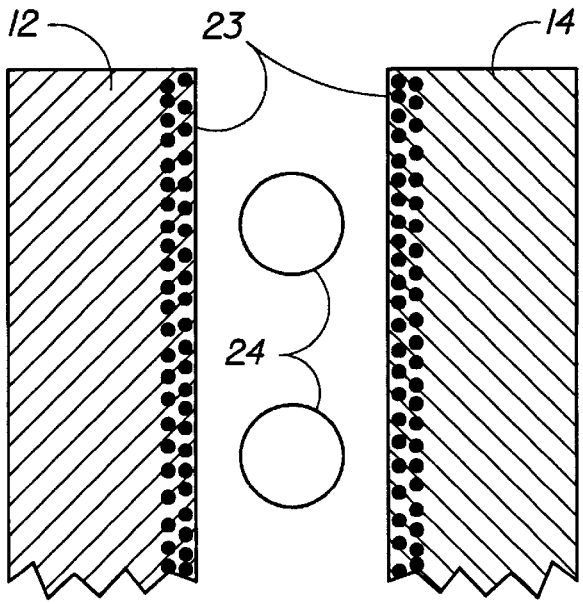
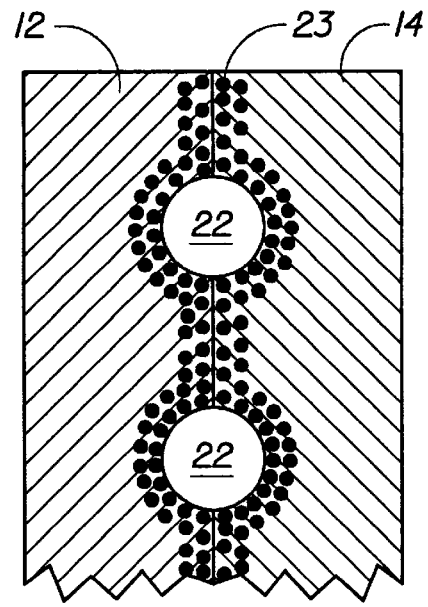
FIG. 2A  FIG. 2B
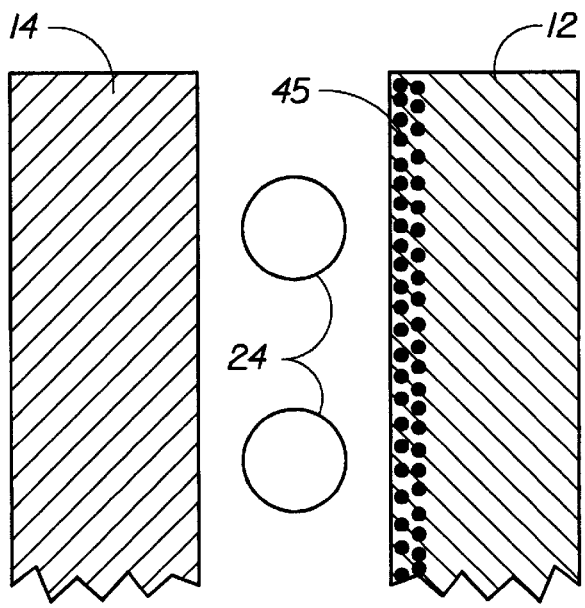
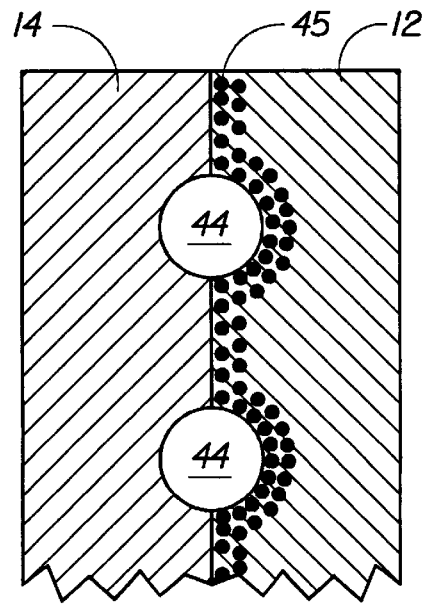
FIG. 4A  FIG. 4B

MEMBRANE AND ELECTRODE STRUCTURE FOR METHANOL FUEL CELL

BACKGROUND OF THE INVENTION

1. Field of the Invention

The present invention relates to the use and manufacture of proton exchange membranes and their application in membrane and electrode assemblies for fuel cells, particularly fuel cells used for the direct oxidation of organic fuels such as methanol, ethanol, dimethoxymethane, and trimethoxymethane.

2. Background of the Related Art

Fuel cells comprising proton exchange membranes are the focus of increasing research efforts in the development of new and clean power sources. These efforts have shown that polymer electrolyte membranes (PEM) also referred to as proton exchange membranes, offer a number of advantages over conventional electrolytes when used in electrochemical devices such as fuel cells and water electrolyzers. Unfortunately, these electrolytes must remain hydrated to retain ionic conductivity, which limits their maximum operating temperature to 100° C. at atmospheric pressure.

This disadvantage of known PEM materials is particularly highlighted in systems in which a polymer electrolyte with high conductivity at temperatures in excess of 100° C. would be useful. One such application is the $H_2/O_2$ fuel cell that utilizes reformed hydrogen from organic fuels (methane, methanol, etc.)

One alternative to the use of pure hydrogen or enriched hydrogen derived from the reformation or partial oxidation of organic fuels in PEM fuel cells which circumvents the aforementioned disadvantage is to oxidize the fuel directly in the fuel cell rather than to employ an intermediate conversion step to hydrogen. Methanol is particularly attractive in this respect since it possesses a high energy density and, because it is a liquid at ambient temperatures like gasoline, much of the infrastructure is already in place for its safe storage and handling.

Methanol fuel cell systems currently under development use low-temperature steam reformers in conjunction with fuel cell stacks to generate power from methanol in indirect systems. By "indirect" it is meant that methanol fuel is processed (by a reformer) before it is introduced into the fuel cell stack. However, the system can be vastly simplified, and the overall system thermal efficiency can be improved if direct anodic oxidation of methanol is achieved at low polarization. A direct methanol fuel cell will also be preferred for vehicular applications because its weight, volume, start-up and load-following characteristics should be more attractive than the more complex indirect systems.

A direct methanol fuel cell (DMFC) which utilizes a proton-exchange membrane as the electrolyte, has the capability to replace batteries in small, portable applications. Analyses indicate that the performance level of this fuel cell at the present time is almost high enough that such a small version of a direct methanol proton exchange membrane fuel system (DMPEMFC) could be competitive with the highest energy density batteries available in terms of size and weight.

The direct methanol fuel cell is a potentially attractive power source for vehicles and other applications in the military as well as the commercial sectors. Benefits to be derived from the use of direct methanol fuel cells as power sources include dramatic reductions in emissions of air pollutants, reduction in the nation's dependence on imported petroleum since methanol can be made from indigenous fuels such as coal and natural gas and also from renewable sources such as wood and biomass, and an overall increase in vehicle energy efficiency. Use of liquid methanol fuel avoids the difficulties and hazards associated with the handling of gaseous reactants such as hydrogen. Vehicles powered by DMFCs have the potential for a very large market in California, the New England States, and other states in the Northeast that have mandated the introduction of zero-emission vehicles by the end of the decade.

Several different types of fuel cells have been evaluated for direct methanol operation, including molten carbonate fuel cells, aqueous carbonate fuel cells, sulfuric acid fuel cells, and phosphoric acid fuel cells. However, due to high projected power densities, low operating temperature and pressure, and the potential for system simplification, the fuel cell system receiving the most attention for transportation applications, using methanol as a fuel, is the proton exchange membrane fuel cell (PEMFC). This fuel cell uses a hydrated sheet of perfluorinated ion exchange membrane as a solid electrolyte in the fuel cell; catalytic electrodes are intimately bonded to each side of the membrane. Membranes of this type are sold commercially, for example, under the trademark NAFION® from E.I. du Pont de Nemours and Company.

However, a major disadvantage limiting the use of known PEM methanol-air fuel cells is that currently available PEM electrolytes do not totally exclude methanol. The PEM-based fuel cell is characterized by the use of a polymer membrane, typically a polyperfluorosulfonic acid such as NAFION®, as the electrolyte. These types of hydrophilic membranes are extremely permeable to both water and methanol, particularly at elevated temperature. In the PEMFC, methanol dissolved in water is supplied to the anode as a liquid, and, as a result of the high permeability and the absence of methanol at the cathode, methanol crosses over from anode to cathode via diffusion. Methanol permeates from the anode chamber of the PEMFC across the membrane, adsorbs on the cathode catalyst, and is oxidized, resulting in a parasitic loss of methanol fuel and reduced fuel cell voltage. Performance losses of 70–150 mV at a given current density have been observed at the cathode of PEMFCs with a direct methanol feed. High rates of methanol crossover from the anode to the cathode may ultimately lead to depolarization of the cathode resulting from oxidation of the fuel at the cathode.

Another subtle yet critically important consequence of the extreme volumes of water and methanol that reach the cathode influences the structure of the cathode, the cathode flow field, and hence, DMFC stack design. Recent experiments with methanol-air stacks have shown that excessively high oxidant flow rates, over five (5) times the stoichiometric requirements, are required to remove excess liquid from the cathode to prevent flooding and maintain stable stack operation. For stacks with high pitch (number of cells per inch), large air pumps are required because of the significant pressure drop within the stack hardware, and the necessary use of larger pumps increases undesirably the level of parasitic electrical power. A means of controlling or removing at least some of the fluids transported through a proton exchange membrane from anode to cathode in an electrochemical cell before they arrive at the cathode is highly desirable.

One avenue of investigation for the reduction of methanol crossover in direct methanol fuel cells involves the modification of known ionomeric polymer systems as a means of enhancing their resistance to methanol crossover. Examples of such modified membranes include membranes with inorganic fillers and multi-layer membranes where the layers have properties that differ from one another. For example, a membrane based on polystyrene sulfonic acid, crosslinked with polyvinylidene fluoride (KYNAR) has been proposed. While this membrane allowed a reduction in methanol crossover it also reduced achievable current density levels.

Attempts have also been made to devise new multi-layer laminates which include proton permeable, methanol impermeable layers within the membrane structure. As an example, a three layer membrane, the middle layer of which was a thin palladium hydride, has been fabricated. The laminate was mounted subsequently in a hydrogen-oxygen fuel cell and subjected to methanol-saturated hydrogen to evaluate the resistance to methanol crossover. Experiments demonstrated that fuel cell performance degradation due to methanol crossover in this hydrogen fuel cell was eliminated. However, it was later determined that the membrane did not work in the DMFC.

SUMMARY OF THE INVENTION

The present invention provides for a membrane comprising an ionically conducting sheet, a catalyst layer disposed within the membrane, and a metal current collector incorporated into the membrane, wherein the metal current collector is in electronic communication with the catalyst layer. The membrane is preferably made of an electronically insulating material such as a fluorinated ion exchange material selected from the group of perfluorinated sulfonic acid polymers, perfluorinated carboxylic acid polymers, perfluoro bisulfonimide polymers, perfluoro phosphonic acid polymers, perfluorinated carbanion acids, and mixtures thereof.

The catalyst layer can be a catalyst capable of electrochemically oxidizing methanol or other organic fuels such as ethanol, dimethoxymethane, and trimethoxymethane. The methanol oxidation catalyst may be selected from platinum, binary platinum-containing alloys such as, platinum-tin, platinum-molybdenum, platinum-ruthenium or ternary platinum-containing alloys, such as, platinum-ruthenium-tungsten, platinum-ruthenium-osmium, and platinum-ruthenium-tin.

In another aspect of the invention, there is provided a membrane having a sheet of electronically insulating ion exchange material, a passage or channel extending through the sheet, where the passage has an inner wall and a first end. There is an electrocatalyst disposed along at least a portion of the inner wall of the passage preferably facing the anode. A metal current collector is incorporated into the membrane and is in electronic communication with the electrocatalyst in the passage. Preferably, the passage has a second end and the metal current collector has a first portion adjacent to the first end of the passage and a second portion adjacent to the second end of the passage. The membrane can be a fluorinated ion exchange material like that described above. The electrocatalyst layer can be a catalyst capable of electrochemically oxidizing methanol or other low molecular weight organic fuel compounds depending on the intended use of the membrane.

In yet another aspect of the present invention, there is provided a method for reducing the amount of reactant or product crossover in an electrolytic cell having an anode, a cathode and a solid polymer electrolyte membrane disposed between the anode and cathode. The membrane has a passage extending therethrough. The method includes allowing the reactant or product to enter the passage; passing a fluid through the passage; receiving the reactant or product in the fluid; and removing the reactant or product from the cell along with the fluid. The fluid can be nitrogen, air or water. Passing a gas such as air or nitrogen through the passage also removes excess water from the membrane that would otherwise crossover to and potentially flood the cathode.

In another aspect, the invention provides a method for making a membrane including, coating at least a portion of a removable element with a catalyst; forming a polymeric material around the catalyst and the removable element to form a membrane, wherein the catalyst adheres strongly to the membrane; and removing the removable element from the membrane to leave a passage extending through the membrane. The passage has at least a portion of an inside surface coated with the catalyst. Preferably the catalyst coated portion of the passage is closer to the anode. The removable element can be a wire, TEFLON tube or a similar element.

Another method for making a membrane is also provided. The method includes applying a catalyst layer to a surface of a first membrane sheet; positioning a removable element between the first membrane sheet and a second membrane sheet, wherein the surface of the first membrane sheet having the catalyst layer faces the removable element; bonding the two membrane sheets around the removable element to form a single membrane; and removing the removable element from the single membrane to form a passage extending through the membrane. The passage provides fluid communication with a portion of the catalyst. The bonding can be carried out by hot pressing. This same method may be employed without the removable element to form a solid membrane with a catalyst layer disposed within the membrane.

In another aspect of the invention, there is provided, a method of forming a metal layer on an ion exchange material. The method comprises contacting the ion exchange material with a solution containing an ion of a metal; allowing the ions of the metal to exchange into the ion exchange material; and chemically reducing the metal ions to form the metal layer as discussed in "Solid Polymer Electrolyte Water Electrolysis", *Int. J Hydrogen Energy*, vol. 7, No. 5, pp. 397–403. (1982). Preferably, a metal layer is formed on an inside surface of the passage and a metal layer is formed on an upper portion and a lower portion of the membrane so that the metal layer in the passage is capable of electronic communication with the metal layer on the upper and lower portions of the membrane. The metal layer in the passage can be an electrocatalyst such as platinum, platinum-ruthenium, or platinum-ruthenium-tungsten.

BRIEF DESCRIPTION OF THE DRAWINGS

So that the features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 1(*b*) is an enlarged view of a cutout of the membrane of FIG. 1(*a*).

FIGS. 2(a–b) are schematic diagrams depicting the steps of fabricating a membrane having passages coated with a catalyst.

FIGS. 4(a–b) are schematic diagrams depicting the steps of fabricating a membrane having passages and a catalyst layer substantially in the plane of the membrane.

DETAILED DESCRIPTION OF THE PREFERRED EMBODIMENT

Figure 1A:
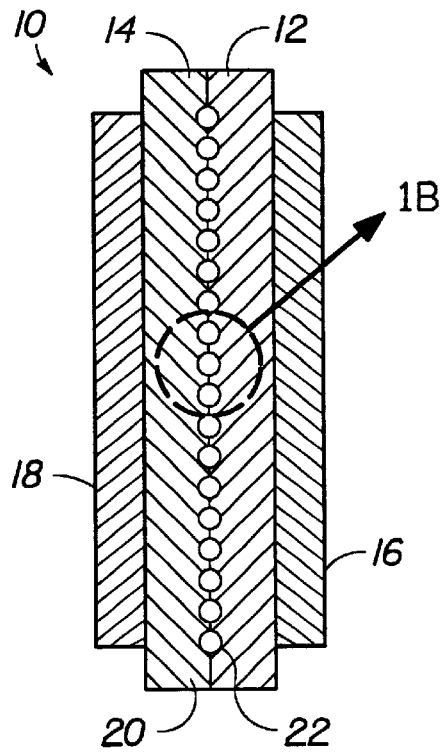
FIG. 1(*a*) is a cross-sectional view of a membrane and electrode assembly of the invention with a membrane having internal passages.

The present invention encompasses approaches that may reduce or totally eliminate fuel crossover in fuel cells using organic fuels such as methanol, ethanol, dimethoxymethane, and trimethoxymethane.

One aspect of the invention provides a membrane with a plurality of passages where the fuel and water diffusing through the membrane, from the anode to the cathode, may be intercepted and sequestered within the void formed by the passages within the membrane. The sequestered liquid may then be physically removed from the void in the membrane by flowing a gas (e.g. air or nitrogen) or a liquid (water, for example) through the plurality of passages in the membrane. Crossover fuel and water transferred due to electroosmosis and other phenomena in route to the cathode of the fuel cell may also be removed at the passage/membrane interface by either evaporation, in the case of gas flow, or by diffusion into a flowing liquid.

Another aspect of the invention provides a membrane with a plurality of passages where the fuel and water diffusing through the membrane, from the anode to the cathode, may be intercepted and sequestered within the void formed by the passages within the membrane. The inner walls of the passages may be coated with a thin, microporous oxidation catalyst, such as a platinum, platinum-ruthenium or platinum-ruthenium-tungsten layer, that is capable of the electrochemical oxidation of the intercepted fuel. Following the electrocatalytic oxidation of a portion of the fuel on the surface of the finely divided catalyst at the passage walls, the by-products produced by the oxidation of the fuel may be removed by the flowing gas stream or a liquid through the membrane passages. The flowing of the gas or liquid through the passages may also help evacuate unoxidized sequestered fuel and remove excess water.

Yet another aspect of the invention provides a membrane with a catalyst layer for the electrocatalytic oxidation of a fuel, disposed in the membrane to cover the passage and non-passage portions of the membrane. The catalyst layer is in electronic communication with a current collector. The current collector provides a pathway for the flow of electrical current from the catalyst so that the catalyst essentially functions as an anode. Dispersing the catalyst in the portions of the membrane without passages allows for the oxidation of the fuel diffusing through those portions. A method for uniformly dispersing the catalyst in the membrane may include disposing a catalyst layer in the plane of the membrane, then forming passages in the membrane. The catalyst layer may uniformly cover the walls of the passages in the membrane as well as the portions of the membrane that separate the passages.

In a further aspect of the invention, the inner walls of the passages may be partly coated with a finely divided, thin, microporous electrocatalyst layer capable of electrochemically oxidizing fuel sequestered in the passages of the membrane. Preferably the portion that carries the electrocatalyst is positioned near the anode. The electrocatalyst layer in the passages may be extended from each passage to establish electrical connection with current collectors disposed in the fuel cell. Electrically shorting the electrocatalyst layers with the cathode (preferably through a load) will electrochemically oxidize the fuel sequestered in the passages. Thus, each passage can function similarly to the anode in the fuel cell and consume crossover fuel by electrochemical oxidation. The products of the electrochemical oxidation of the sequestered fuel may be removed by flowing a gas or liquid stream through the passages.

A membrane with internal passages may be fabricated by various methods. Particularly, the invention encompasses the techniques of fabricating tubulated membranes described in detail in U.S. Pat. No. 5,635,039 issued Jun. 3, 1997, incorporated herein by reference in its entirety.

In one aspect of the invention, two PEM fragments, each having one side coated with a thin film electrocatalyst layer may sandwich a plurality of TEFLON passage forming elements. The passage forming elements may be disposed between the sides of the PEM fragments opposite the sides coated with the electrocatalyst layer. The assembly may be sealed by hot pressing or other sealing methods. The passage forming elements can then be removed to form the internal passages. The internal passages formed within the interior of the membrane can have top and bottom openings that will allow flowing gas or liquid streams through the passages to physically remove fuel, or its electrochemical oxidation products, that may diffuse through the membrane and reside in the passages during the operation of a fuel cell comprising the membrane described herein.

The invention provides a method for fabricating a membrane and electrode (M&E) assembly having a continuous catalyst layer internal to the membrane, disposed in the plane of the membrane, and covering both the passage and non-passage portions of the membrane. In fabricating the M&E assembly, a thin catalyst layer may be applied to one side of a first thin PEM fragment and another thin film electrocatalyst layer may be applied to the opposing side of the same PEM fragment. A thin film electrocatalyst layer may also be applied to one side of a second PEM fragment. The removable elements of the M&E may then be sandwiched between the two PEM fragments and the complete assembly may be bonded together to form a single M&E structure. The bonding of the M&E assembly and the formation of passages within the membrane may be conducted according to the techniques described in detail in U.S. Pat. No. 5,635,039. For example, small diameter removable TEFLON passage forming elements may be disposed between the PEM fragments; and the assembly may be hot pressed to bond the assembly and form membrane passages that surround the removable passage forming elements. The assembly may then be sealed, and the passage forming elements removed to form the internal passages of the M&E structure. The characteristics of TEFLON allow easy removal of the passage forming elements after the bonding step is completed.

The invention also provides a method of fabricating a membrane with internal passages having inner walls coated with a catalyst. Two PEM fragments may sandwich a plurality of TEFLON passage forming elements coated with catalyst. The assembly may then be hot pressed and sealed. The passage forming elements are then removed to form the internal passages with inner walls comprising a film of catalyst. The catalyst preferably only weakly adheres to the passage forming element and can be an electrocatalyst like that described previously.

The invention further provides an alternate method of fabricating a membrane with internal passages having inner walls coated with a catalyst. Two PEM fragments, each having one side coated with a thin film catalyst layer may sandwich a plurality of Teflon passage forming elements. The passage forming elements may be disposed between the sides of the PEM fragments opposite the sides coated with the catalyst layer. The assembly may then be hot pressed and sealed. The passage forming elements are removed to form the internal passages.

The finely divided electrocatalyst particles make up the catalyst layer and are mostly in physical contact with one another, thus, providing electronic conductivity within the layer. The voids between the catalyst particles allow the migration of solvated protons between the anode and the cathode, thus, ensuring that good ionic conductivity is maintained. Generally, two membrane segments with electrocatalyst particles deposited to a depth of 2–8 $\mu$m along one face of one membrane only and to the full thickness of the latter membrane segment at the edges containing the entrances and the exits of the passages to a distance of about 1–3 cm along the length of this segment can be used. Regions of the membrane having electrocatalytic particles incorporated can be described as a polymer/catalyst composite of mixed conductivity (ionic and electronic) that allows the transport of water and miscible solvents. The electrocatalyst is capable of electrochemically oxidizing water soluble organic fuels.

Another method for making a membrane with catalyst lined passages includes impregnating the inner walls of the passages with an appropriate solution containing the ion of a metal catalyst, such as platinum, ruthenium, tin, tungsten, osmium or mixtures thereof. The solution is permitted to stand in the passages for a period of time sufficient for the metal ions to impregnate the walls of the passages through ion exchange. The solution is then flushed from the passages; the passages are rinsed, and the metal ions remaining within the walls of the passages are chemically reduced. The reduction of the exchanged ions may be conducted using either an aqueous solution containing a reducing agent, such as lithium borohydride, or by introducing a reducing gaseous environment such as hydrogen gas into the passages. The impregnation, flushing and reduction steps may be repeated as many times as necessary to obtain passages with inner walls comprising a catalyst layer of a desired thickness.

Another aspect of the invention provides a method of fabricating a membrane with internal passages having inner walls impregnated with an electrocatalyst like that described in the preceding paragraph. The membrane may inhibit or prevent methanol crossover from the anode to the cathode by electronically connecting the catalyst-coated passages to a current collector and electrochemically oxidizing the methanol sequestered in the passages. Using the membrane formed above, the lower portion of the M&E assembly may be immersed in the same metal ion solution used to impregnate the inner walls of the internal passages with the electrocatalyst layer. The ion exchange/reduction process is repeated to form an electronically conducting current collector that is in electrical contact with the individual catalyst-lined passages in the M&E structure. The procedure is repeated for the upper portion of the M&E assembly to form a second current collector in electrical contact with the catalyst lined passages. Each of these current collectors may be in contact with the anode.

FIG. 1(a) is a cross-sectional top view of a membrane and electrode assembly 10 using the membrane 20 having internal passages 22. The M&E 10 comprises a membrane formed by bonding two PEM fragments 12 and 14, a cathode 16 and an anode 18. The passages in this assembly are not lined or coated with a catalyst. The passages serve to sequester any fuel that crosses through the membrane from the anode where it may be flushed out with a fluid such as nitrogen, air or water.

Figure 1B:
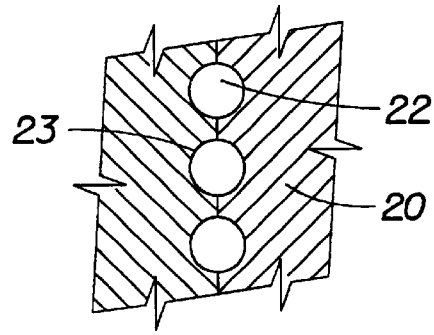

FIG. 1(b) is an enlarged view of a cutout of the membrane of FIG. 1(a). The internal passages 22 may intercept and sequester fuel that may crossover from the anode 18 to the cathode 16. The internal passages may be coated with a catalyst layer 23.

FIGS. 2(a–b) are schematic diagrams depicting the steps of fabricating the membrane and electrode assembly of FIG. 1(a). Passage forming elements 24 are sandwiched between a first PEM fragment 12 comprising an electrocatalyst layer 23 and a second PEM fragment 14 comprising an electrocatalyst layer 23. The PEM fragments are hot pressed with the passage forming elements positioned between them. After the membrane is pressed and sealed the passage forming elements 24 are removed to form the internal passages 22 within the membrane.

Figure 3:
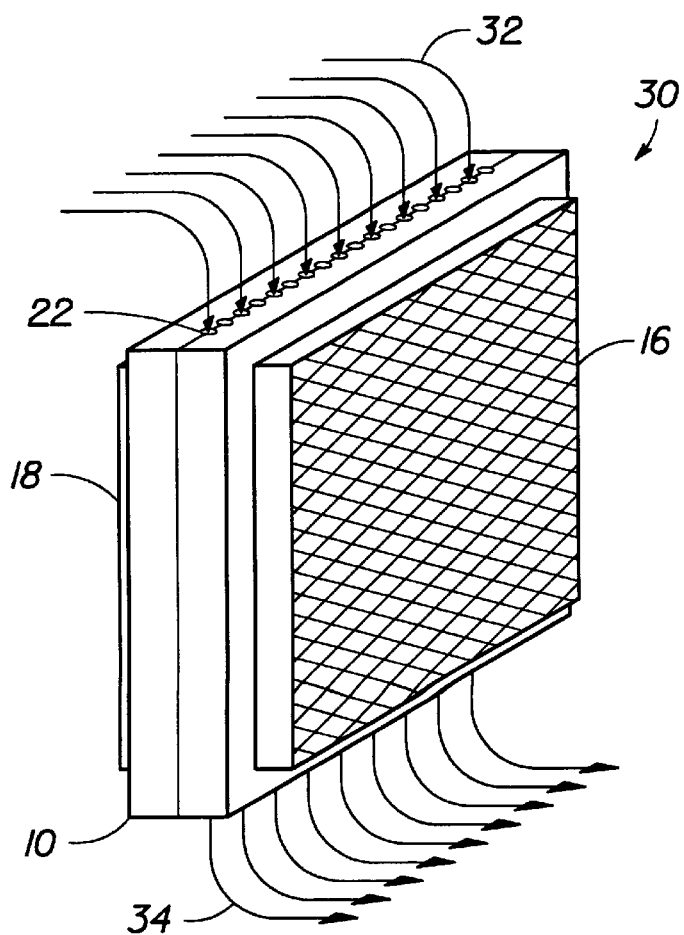
FIG. 3 is a schematic diagram illustrating the operation of a fuel cell comprising the membrane and electrode assembly of FIG. 1(a).

FIG. 3 is a schematic diagram illustrating the operation of a fuel cell comprising the membrane and electrode assembly of FIG. 1(a). The fuel cell 30 comprises a membrane and electrode assembly 10 with internal passages 22. The passages 22 intercept the fuel that may crossover from the anode 18 to the cathode 16. A flow 32 of a gas or a liquid is passed through the passages 22 to evacuate the sequestered fuel. Physical evacuation of sequestered fuel allows a significant reduction in the quantities of fuel and water reaching the cathode, thus substantially enhancing the cell performance of the fuel cell 30.

FIGS. 4(a–b) is a cross-sectional view of a membrane of the invention having passages 44 and a catalyst layer 45 in the plane of the membrane. At least part of the inner walls of the passages 44 are coated with a thin, microporous electrooxidation catalyst (e.g. platinum, platinum-ruthenium or platinum-ruthenium-tungsten) layer 45 that is capable of the electrochemical oxidation of the crossover fuel. The sequestered fuel is oxidized before it diffuses through the PEM fragment 12 of the membrane. Following the electrocatalytic oxidation of a portion or all of the crossover fuel on the surface of the finely divided catalyst at the passage walls, the by-products produced by the oxidation of the sequestered fuel along with the electroosmotically transported water are removed conveniently by the flowing gas stream through the passages as described in FIG. 3. Unoxidized sequestered fuel may also be evacuated when a fluid stream such as air or water is passed through the passages.

Figure 5:
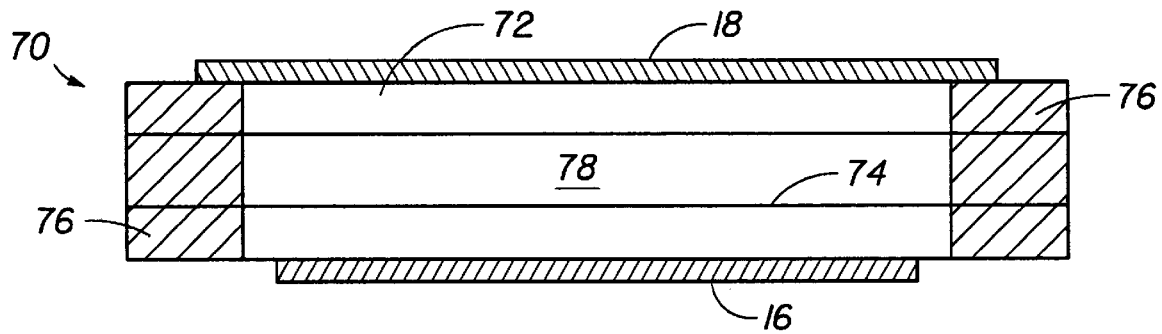
FIG. 5 is a cross-sectional view of a membrane and electrode assembly of the invention with a membrane having passages with inner walls covered with a catalyst layer and current collectors in electronic communication with the catalyst lined passages.

FIG. 5 is a side view of a membrane and electrode assembly 70 of the invention with a membrane 72 having passages 78 with inner walls covered with an electrocatalyst layer 74 which are connected to current collectors 76. A cathodic electrocatalyst layer 16 is attached to one side of the membrane 72 and an anodic electrocatalyst layer 18 is attached to the opposite side of the membrane 72. The current collectors 76 are in electrical communication with the anode electrocatalyst layer 18. On stacking a plurality of membrane and electrode assemblies 70, in a bipolar filter press-like fuel cell stack, the electrons generated at the electrocatalyst layers 74 and 18 flow from one cell to another in series by means of bipolar plates and eventually flow out of the stack at the anodic electrical terminal which is electrically connected to one side of an external load. The other side of the external load is connected to the cathodic electrical terminal attached to the fuel cell stack. This terminal is in electrical communication with the cathodic electrocatalyst layers 16.

The inner walls of the passages are at least partly coated with a finely divided, thin microporous electrocatalyst layer 74 capable of electrochemically oxidizing organic fuel in an aqueous solution. The layer 74 is extended for each passage along the length of the PEM in order to establish electrical connection with the current collectors 76. The anodic electrocatalyst layer 18 is sized to make the layer come in contact with the current collectors 76, so that electrons generated at the anodic electrocatalyst layers are carried out through the electrocatalyst layers lining the inside of the passages and through the current collectors in contact with them. Upon electrically shorting the thicker current collector layer (preferably through a load as described above), and hence the cylindrical electrocatalyst layers, with the cell cathode, at least some of the permeating fuel is oxidized electrochemically at the walls of the cylindrical electrocatalyst layer 74. Thus, each passage serves as a fuel consumption anode and functions identically to the anode 18 of the DMFC, but consumes crossover methanol sequestered in the passages 90.

Figure 6A:
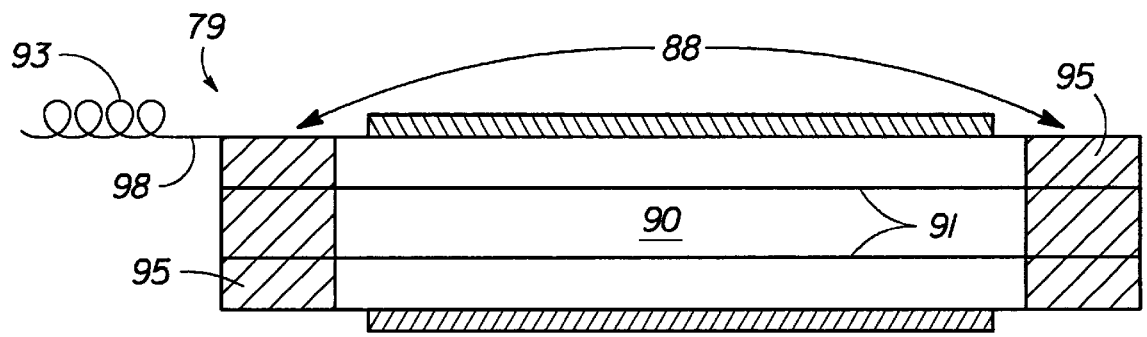
FIG. 6(a) is a cross-sectional view of one membrane and electrode assembly of FIG. 6(b).
Figure 6B:
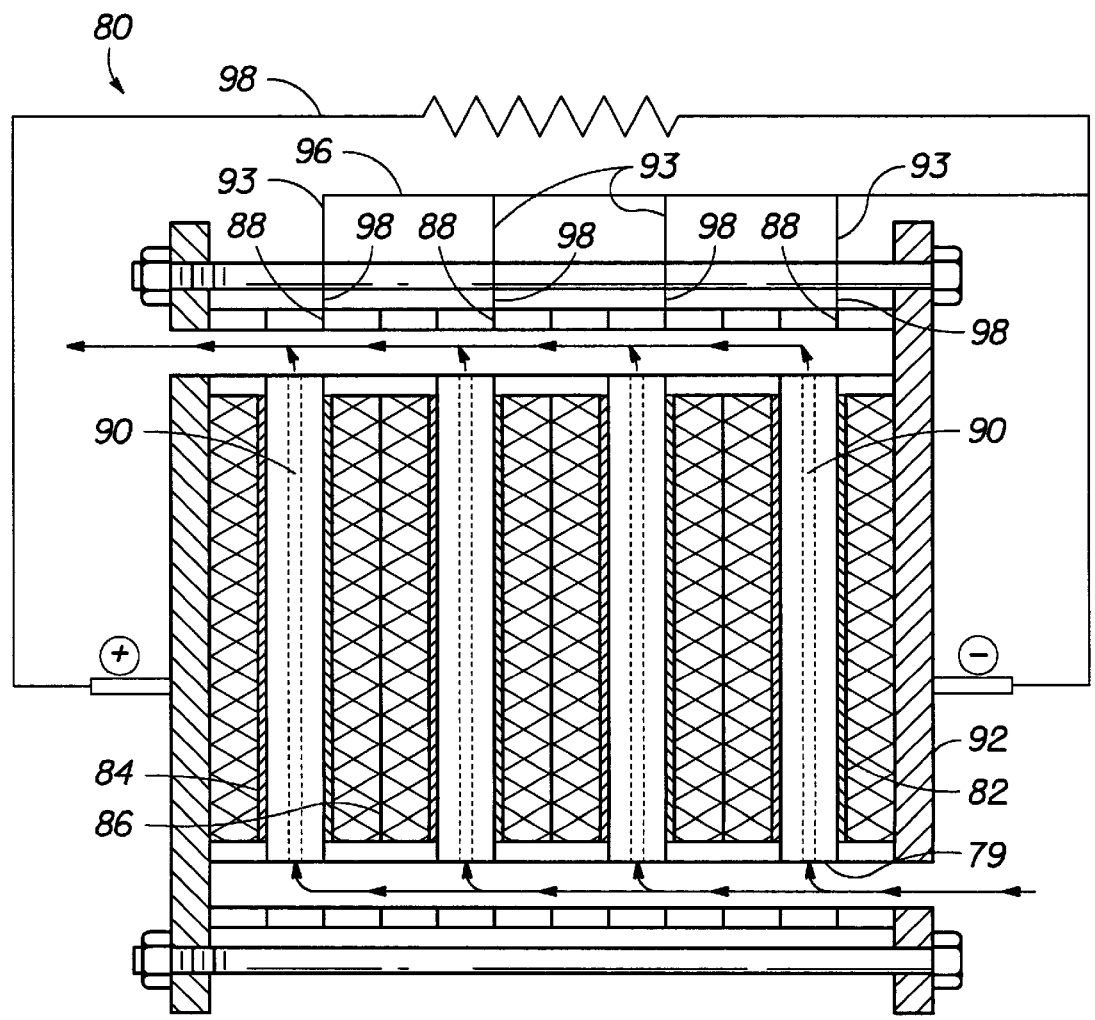
FIG. 6(b) is a cross-sectional view of a stack of membrane electrode assemblies using the membrane of the present invention.

FIG. 6(a) shows a membrane and electrode assembly 79, representative of a membrane and electrode assembly contained in the stack shown in FIG. 6(b), containing catalyzed passages 90 within the membrane structure where the finely divided, thin, microporous catalyzed layers 91 on the walls of the passages are in electronic communication with the primary metallic current collectors 95 at two edges of the membrane corresponding to the entrance and exit points of the passages. The metallic current collectors 95, which are incorporated within the bulk of the membrane at these two edges, are physically in contact with a secondary metal shim current collector 88, geometrically configured like a picture frame. The metal shim has a tab 98 at one edge which extends beyond the edge of the cell. An external wire lead 93 is spot welded or soldered to the tab 98.

FIG. 6(b) is a cross-sectional view of a stack 80 of membrane and electrode assemblies 78 in a filter press like arrangement where the anode 82 of each cell is electrically connected to the cathode 84 of an adjacent cell by means of a bipolar plate 86. For the stack shown, a metal shim 88 is used as a secondary current collector to collect current from the catalyzed passages 90 (shown in dotted lines) within the membrane structures. Wires 93 spot welded to the tabs 98 at one edge of each shim (shown in FIG. 6(a)) are in turn spot welded to a bus bar 96 which is in turn connected to the electrical lead 98 that is attached to the end plate 92 making electrical contact with the anode of the first cell. Also shown in the illustration is the internal manifolding for supplying fluids to, and withdrawing fluids from, the passages within the membrane structures. Internal manifolding for supplying reactants to and withdrawing products from the flow passages at the back of each anode and cathode for each cell in the stack is not shown.

Figure 7:
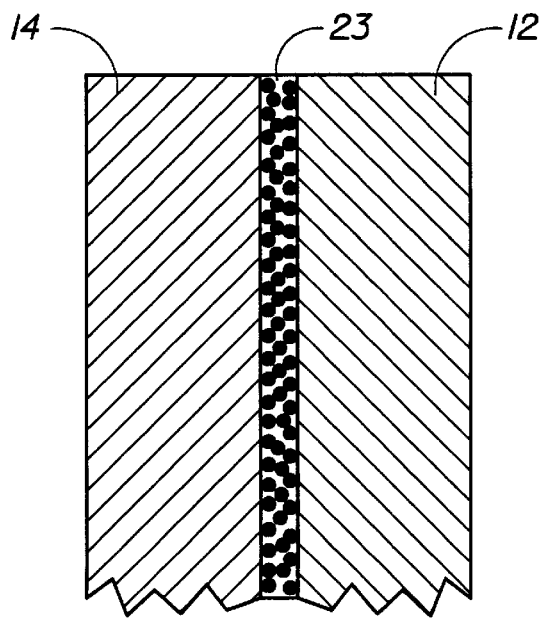
FIG. 7 is a cross-sectional view of a membrane showing the catalyst layer disposed within the membrane.

FIG. 7 shows a membrane formed by bonding two PEM fragments 12 and 14 like that in FIG. 1, however, there are no passages in the membrane and an electrocatalyst layer 23 is positioned substantially in a plane of the membrane. The electrocatalyst layer 23 is in electronic communication with a metallic current collector as discussed above.

While the foregoing is directed to the preferred embodiment of the present invention, other and further embodiments of the invention may be devised without departing from the basic scope thereof, and the scope thereof is determined by the claims which follow.

What is claimed is:

1. A membrane comprising:
  (a) an ionically conducting sheet;
  (b) a catalyst layer disposed within the sheet; and
  (c) a metal current collector incorporated into the sheet, wherein the metal current collector is in electronic communication with the catalyst layer.

2. The membrane of claim 1, wherein the sheet consists of an electronically insulating material.

3. The membrane of claim 2, wherein the sheet is a fluorinated ion exchange material selected from the group of perfluorinated sulfonic acid polymers, perfluorinated carboxylic acid polymers, perfluoro bisulfonimide polymers, perfluoro phosphonic acid polymers, perfluorinated carbanion acids, and mixtures thereof.

4. The membrane of claim 1, wherein the catalyst layer comprises an electrocatalyst.

5. The membrane of claim 4, wherein the electrocatalyst is selected from platinum, platinum-ruthenium, platinum-tin, platinum-molybdenum, platinum-ruthenium-tungsten, platinum-ruthenium-osmium, and platinum-ruthenium-tin.

6. A membrane comprising:
  (a) a sheet of electronically insulating ion exchange material having top and bottom surfaces;
  (b) a passage extending through the sheet, the passage having an inner wall and a first end;
  (c) an electrocatalyst disposed along the inner wall of the passage; and
  (d) a metal current collector incorporated into a portion of the sheet, wherein the metal current collector is in electronic communication with the electrocatalyst in the passage.

7. The membrane of claim 6, wherein the passage further comprises a second end and the metal current collector comprises a first portion adjacent to the first end of the passage and a second portion adjacent to the second end of the passage.

8. The membrane of claim 6, wherein the sheet is a fluorinated ion exchange material selected from the group of perfluorinated sulfonic acid polymers, perfluorinated carboxylic acid polymers, perfluoro bisulfonimide polymers, perfluoro phosphonic acid polymers, carbanion acids, and mixtures thereof.

9. The membrane of claim 8, wherein the electrocatalyst is selected from the group of platinum, platinum-ruthenium, platinum-tin, platinum-molybdenum, platinum-ruthenium-tungsten, platinum-ruthenium-osmium, and platinum-ruthenium-tin.

10. A method for reducing the amount of reactant or product crossover in an electrolytic cell comprising an anode, a cathode and a solid polymer electrolyte membrane disposed between the anode and cathode, wherein the membrane has a passage extending therethrough, the method comprising:

(a) allowing the reactant or product to enter the passage;

(b) passing a fluid through the passage;

(c) receiving the reactant or product in the fluid; and (d) removing the reactant or product from the cell along with the fluid.

11. The method of claim 10, wherein the fluid is selected from air, nitrogen, and water.

12. A method for making a membrane comprising, coating at least a portion of a removable element with a catalyst;

forming a polymeric material around the catalyst and the removable element to form a membrane, wherein the catalyst adheres to the membrane; and removing the removable element from the membrane to leave a passage extending through the membrane, the passage having at least a portion of an inside surface coated with the catalyst.

13. The method of claim 12, wherein the removable element is a wire.

14. The method of claim 12, further comprising forming a current collector on a portion of the membrane, wherein the current collector is in electronic communication with the catalyst.

15. A method for making a membrane, the method comprising applying a catalyst layer to a portion of a surface of a first membrane sheet;

positioning a removable element between the first membrane sheet and a second membrane sheet, wherein the surface of the first membrane sheet having the catalyst layer faces the removable element;

bonding the two membrane sheets around the removable element to form a single membrane; and removing the removable element from the single membrane to form a passage extending through the membrane, the passage providing fluid communication with a portion of the catalyst.

16. The method of claim 15, wherein the step of bonding comprises, hot pressing.

17. The method of claim 15, further comprising forming a current collector on a portion of the membrane, wherein the current collector is in electronic communication with the catalyst.

18. A method of forming a metal layer on an inside surface of a passage formed in an ion exchange material, the method comprising:

(a) contacting the inside surface of the passage formed in the ion exchange material with a solution containing an ion of a metal;

(b) allowing the ions of the metal to exchange into the inside surface of the passage formed in the ion exchange material; and (c) chemically reducing the exchanged metal ions in the ion exchange material to form the metal layer.

19. The method of claim 18, further comprising forming a metal layer on an upper portion and a lower portion of the membrane so that the metal layer in the passage is capable of electrical communication with the metal layer on the upper and lower portions of the membrane.

20. The method of claim 18, wherein the metal layer in the passage is an electrocatalyst.

21. A method for making a membrane, the method comprising:

applying a catalyst layer to a portion of a surface of a first membrane sheet;

positioning the first membrane sheet and a second membrane sheet, wherein the surface of the first membrane sheet having the catalyst layer faces the second membrane sheet; and bonding the two membrane sheets to form a single membrane.

22. The method of claim 21, further comprising forming a current collector on a portion of the membrane, wherein the current collector is in electronic communication with the catalyst layer.

* * * * *